United States Patent Office 3,782,900
Patented Jan. 1, 1974

3,782,900
GAS-LIQUID CHROMATOGRAPHIC DETERMINATION OF NITRATE ESTERS, STABILIZERS AND PLASTICIZERS IN NITROCELLULOSE-BASE PROPELLANTS AND NITROGLYCERINE IN PHARMACEUTICALS
Hiram W. H. Dykes and Bernard J. Alley, Huntsville, Ala., assignors to the United States of America as represented by the Secretary of the Army
Filed May 4, 1972, Ser. No. 250,253
Int. Cl. G01m 31/08
U.S. Cl. 23—230 R                 30 Claims

ABSTRACT OF THE DISCLOSURE

A gas-liquid chromatographic method for determining nitrate esters as well as stabilizers and plasticizers in a wide variety of nitrocellulose-base propellants. The method is also applicable to the determination of nitroglycerine in pharmaceutical preparations. The method employs chromatographic columns having a silicone stationary phase selected from nonpolar dimethylsilicone, polar trifluoropropyl silicone, and highly polar cyanopropyl phenyl silicone. The solid support of the columns is comprised of a flux-calcined, diatomaceous earth treated with a silane. The method of this invention utilizes columns that preclude on-column decomposition which is essential for determination of nitrate esters, as well as the plasticizers and stabilizers, in all types of nitrocellulose-base propellants. The method employs an electronic digital integrator which provides for sensitive detection of the nitrate ester with a precise measurement of its peak area. The method employs semimicro calibration and extraction procedures which substantially reduce analysis time. The extraction procedure utilizes an ultrasonic cleaner which effectively reduces the extraction time as compared to prior art extraction procedures.

BACKGROUND OF THE INVENTION

This invention relates to a gas-liquid chromatographic method for qualitative and quantitative analyses of nitrate esters, stabilizers, and plasticizers in a wide variety of nitrocellulose-base propellants. The invention also relates to a gas-liquid chromatographic method for precisely determining nitroglycerine in pharmaceutical preparations.

Controlling the quality of nitrocellulose-base propellants and monitoring chemical changes induced by storage requires determination of the nitrate esters, stabilizers, and plasticizers. The specified ingredients are usually the major propellant ingredients used in combination with the nitrocellulose binder. The standardized wet chemical and spectrometric methods for determining these components are time-consuming and complex, in that the methods have to be modified for different combinations. For further background concerning the standardized wet chemical and spectrometric methods refer to Military Standard Propellants, Solid: Sampling, Examination and Testing (MIL-STD-286B, 1967).

Relatively straightforward gas-liquid chromatographic (GLC) procedures have already been successfully used to determine stabilizers and plasticizers in single-base propellants and plasticizers in double-base propellants. An analytical method with precision comparable to that of the standardized determination methods has been employed for determining stabilizers and plasticizers in several single-base propellants. A GLC method for determining methyl centralite and diphenylamine in single-base 20 mm. gun propellant has been used. A GLC method for determining dimethyl-, diethyl-, and dibutylphthalate plasticizers in small arms double-base propellants has been reported.

A GLC method has also been used for determining stabilizers in double- and triple-base propellants. The problem of nitrate ester decomposition products reacting with the stabilizers to give anomalous results required a modification to the method. Trowell and Philpot solved this problem by programming the column temperature to separate the nitrate ester from the stabilizer before reaction could take place. This procedure, however, as reported by J. M. Trowell and M. C. Philpot, Anal. Chem., 41 (1969), 166, does not provide for determination of the nitrate esters in nitrocellulose-base propellants, and no effective GLC method has been reported. Nitrate esters, particularly nitroglycerine (glyceryl trinitrate), are more difficult to determine than stabilizers and plasticizers because of their low thermal stability and their tendency to decompose on improperly prepared columns. The numerous GLC methods reported for determining nitrate esters in other materials are not applicable to propellants because of the stabilizer interference.

Desirable would be a method for the determination of nitrate esters, as well as the plasticizers and stabilizers, in all types of nitrocellulose-base propellants. Particularly desirable would be a method which could be used for analysis work for determining nitroglycerine in nitrocellulose-base propellants, as well as, for determining nitroglycerine in pharmaceutical preparations.

An object of this invention is to provide a gas-liquid chromatographic method for determining nitrate esters as well as stabilizers and plasticizers in a wide variety of nitrocellulose-base propellants.

Another object is to provide a method which is adaptable for determining nitroglycerine in pharmaceutical preparations.

A further object is to provide a method which permits extension of the prior art methods to result in greater precision in qualitative and quantitative analyses of nitrate esters, stabilizers, and plasticizers while substantially reducing the times required for extractions of samples and analyses times.

SUMMARY OF THE INVENTION

The method of this invention utilizes gas-liquid chromatographic (GLC) procedures to detect and determine nitrate esters, stabilizers, and plasticizers in nitrocellulose-base propellants. The method includes a procedure for determining nitroglycerine in pharmaceutical preparations.

GLC columns used in the method of this invention are prepared by packing a column (⅛ inch x 2 feet) of chromatographic grade stainless steel with a solid support (80–100 mesh) comprised of a flux-calcined, diatomaceous earth treated with a silane. The solid support material is sold under trademarks Gas-Chrom-Q and Chromosorb-W-H-P. by Applied Science, Inc. and Hewlett-Packard respectively. A suitable silane used for treating the solid support is dimethyldichlorosilane, a silylation reagent sold by Pierce Chemical Co. The stationary phase material used in this invention is selected from the following: a nonpolar dimethylsilicone sold as OV-101 by Pierce Chemical Co.; polar trifluoropropyl silicone sold as OV-210, by Supelco, Inc.; highly polar cyanopropyl phenyl silicone sold as OV-225, by Applied Science Laboratories, Inc.; and a nonpolar dimethylsilicone sold as UCW-98 by Hewlett-Packard. The silicone stationary phases are chosen to cover a wide range of polarities.

The column packings are prepared by a filtration-fluidization procedure in which the solid support is first slurried in a volatile solvent containing the stationary phase, and the excess solvent solution is removed by filtration. The damp packing is dried in a Hi-Eff. fluidizer marketed by Applied Science. Refer to Bulletin No. 2A, Preparation of Coated Packings-Use of the Hi-Eff. Fluidizer, Applied Science Laboratories, Inc., State College, Pa., 1967, for additional information concerning the subject matter. To ensure solid packing of the column the packing material is added in small increments and the tubing is taped during the process.

A flame ionization detector is used as the detector since it provides a greater sensitivity. Flame ionization detectors can be used with any inert carrier gas; however, nitrogen or helium are generally used.

The method of this invention works well with a Hewlett-Packard model 7624A gas chromatograph. Eluted components are detected with dual hydrogen flame ionization detector, and peak areas are measured with an electronic digital integrator such as a Hewlett-Packard 3370A. All gases should be of high purity and should be passed through drying tubes before entering the chromatograph.

The helium carrier gas flow is set at about 40 ml./min., and the air flow at 500 ml./min. The hydrogen flow is set at about 32 ml./min. or to a value to give maximum sensitivity.

Dual columns are arranged so that a ⅛ in. Swagelok brass T is installed in the A column between the outlet of a standard injection block and the inlet to the column to serve as an on-column injection port. The described arrangement permits the injection and rapid response to a 1 microliter sample. The samples are injected on the column at an initial temperature of 70° C. The column oven is then linearly temperature-prgorammed to elute the components.

An internal standard is used for the quantitative analyses. The type of internal standard is not critical—nitrate esters, stabilizers, plasticizers, and normal alkanes give comparable results—but normal alkanes are preferred for ease of handling.

DESCRIPTION OF THE PREFERRED EMBODIMENTS

The method of this invention utilizes GLC columns that are precisely prepared and that employ silicone stationary phases to cover a wide range of polarities thereby permitting the separating, identifying, and determining of the amounts of nitrate esters, stabilizers, and plasticizers in propellants. Nitroglycerine is also determined in pharmaceutical preparations.

The method of this invention employs a simple calibration procedure for establishing the component calibration factors. The detector response of each component being detected is a linear function of the component concentration with zero or negligible intercept. The component percentages (wt. percent)$_c$ are calculated by the linear expression:

$$(\text{Wt. percent})_c = \frac{(A_c)(F_c)(W_s)(100)}{(A_s)(W_p)}$$

where W and A are the weights and peak areas respectively, the subscripts refer to the component $c$, the internal standard $s$, and the propellant $p$, and $$F_c = \frac{(A_s)(W_c)}{(A_c)(W_s)}$$

The calibration factor $F_c$ is the inverse of the relative response factor. The $F_c$ of each component is checked daily; the values for the stabilizers and plasticizers do not vary significantly over a period of several weeks, but those of the nitrate esters vary from day to day.

A semimicro procedure is used for the preparation of the calibration mixture, which is made up of the components of the propellant extract to be analyzed, in approximately the same proportion, and the internal standard. In general the stabilizer and plasticizer weights range from 1 to 10 mg. and the nitrate esters from 10 to 40 mg. The component and internal standard quantities, are weighed to a precision of ±1 μg. by a Cahn Gram Electro-balance, and placed in separate DSC (differential scanning calorimeter) aluminum sample pans. The pans are transferred to a dried 1-dram glass vial and 1 to 2 ml. of solvent is added to each vial.

Methylene chloride is used as the solvent for direct analysis of all mixtures. Resorcinol has lower solubility in methylene chloride than in 1,2-dichloroethane. Therefore, 1,2-dichloroethane is generally preferred when there are greater amounts of resorcinol present in sample. In the course of the discovery it was found that 1,2-dichloroethane is suitable for analysis of all components of interest, and is probably preferable to the methylene chloride because of its higher boiling point and greater solvent capabilities. When the silylation of resorcinol is desired, a 0.5 ml. quantity of BSA is added to the completed calibration mixture in the vial. This procedure also silylates the impurities of NG containing hydroxyl groups; the trimethylsilyl (TMS) derivative of resorcinol is formed immediately, but 10 to 20 minutes is required for quantitative conversion of the NG impurities to the TMS derivatives.

The vials containing the completed calibration mixtures are sealed with a polyethylene stopper and shaken vigorously to form a homogeneous solution. This solution is then poured into another 1-drum vial to separate it from the aluminum pans and thus preclude the possibility of metal catalysis of decomposition reactions.

Propellant samples: The propellant is cut into short, thin slices and for each test a 0.1-to-0.2-gram sample, weighed to ±0.1 mg., is placed in a 13-mm. x 100-mm. test tube. The internal standard is weighed (±1 μg.) into a DSC pan which is also placed in the tube. A 2-ml. quantity of methylene chloride is added and the tube is covered with aluminum foil. The sample tubes, in pairs, are suspended in the bath of a Beckman 977 ultrasonic cleaner and propellant components are extracted from the samples by a 15-minute exposure to ultrasonic radiation. The extract is separated from the propellant residue and DSC pan, and 1-μl. aliquots of the extract are injected on the column and analyzed. The silylation procedure is the same as that used for the calibration mixture.

Nitroglycerine analysis: An extensive evaluation was made on the experimental factors that affect the precision and accuracy of the determination of NG since it is the nitrate ester most commonly used in nitrocellulose-base propellants. NG is also the most unstable. Procedures developed for NG determination can be expected to apply equally well to other nitrate esters. The use of a high quality column is found to be essential, and the filtration-fluidization method of preparing packings consistently resulted in acceptable columns. An attempt to improve column efficiency by sieving the packing, however, has a deleterious effect.

Figure 1:
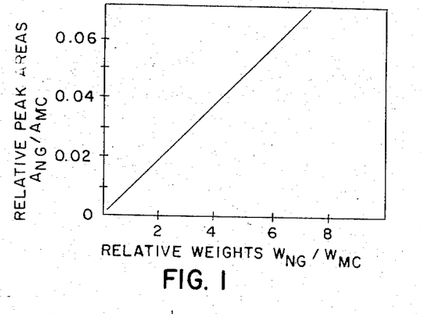
FIG. 1 is a calibration curve for nitroglycerine (NG) with methyl centralite (MC) standard.
Figure 2:
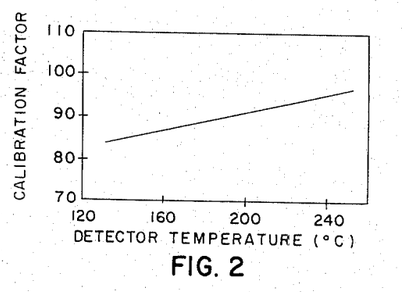
FIG. 2 shows the effect of flame ionization detector temperature on NG calibration factor.

When the recommended procedure and an acceptable column is used, the NG detector response is a linear function of the NG concentration, as shown in FIG. 1, indicating that no detectable amount of decomposition occurred on the column. In this particular case the NG calibration factor is not affected by the sample size or the column temperature programming rate. However, reproducible decomposition of NG did occur in the connecting tubing between the end of the column and the flame ionization detector jet, which is maintained at the detector temperature. As a consequence the NG calibration factor varies with the detector temperature: the relationship is linear up to 250° C., as shown in FIG. 2, but at some point above that temperature the calibration factor deviates from linearity in an unpredictable manner. Because of this sensitivity, the accurate determination of NG requires careful control of the detector temperature between calibration and analysis, and also more frequent calibration than is necessary in the case of stabilizers and plasticizers. The retention data obtained for the most commonly used nitrate esters, stabilizers, and plasticizers are listed in Table II. The Kovats index of each component is determined by using normal alkanes with an even number of carbon atoms.

The Kovats' index is a preferred method of recording retention data for further interpretation and correlating of chromatogram data. The retention temperatures for two alkanes with even numbered carbons which in each case bracket the retention temperatures of the compounds set forth in Table II serve as a basis for interpolating the Kovats' index for each of the compounds specified. For example, a Kovats' index of 1348 would be a compound having a retention temperature between the retention temperatures of a 12 and a 14 carbon atom alkane compound.

The majority of nitrocellulose-base propellants can be analyzed for these components by using one or more of the columns shown. The chromatographic conditions can be varied to meet the speed and resolution requirements of a particular analysis; for example, for routine applications it might be preferable to use a single column with a mixed packing rather than multiple columns. The composition of this mixed packing for any given separation of components can be determined from the data in Tables I and II.

Figure 3:
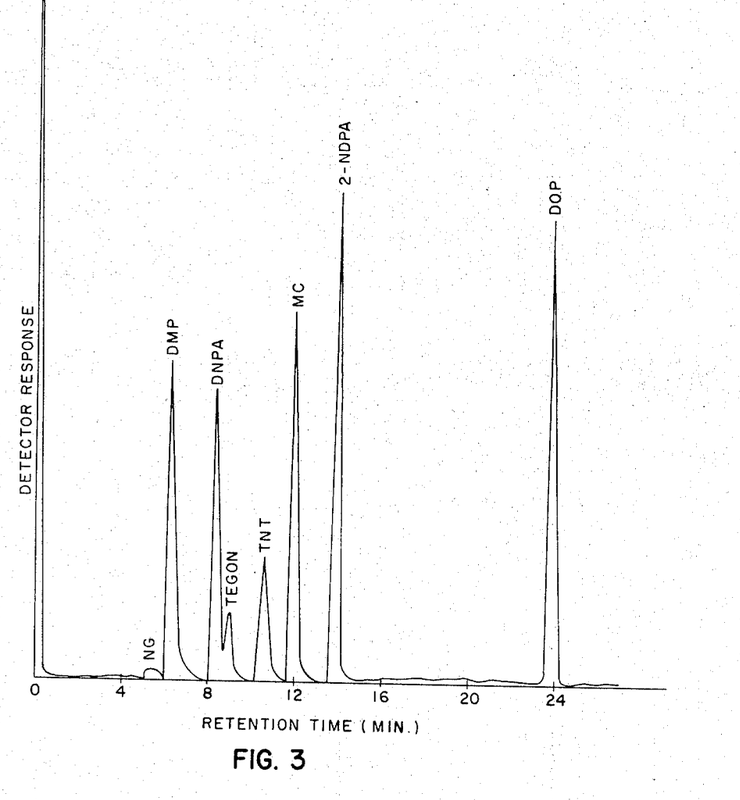
FIG. 3 is a gas chromatogram of a mixture of nitrate esters, stabilizers, and plasticizers on 3.8% OV–101 column. Conditions: Column temperature-programmed from 70° C. to 220° C. at 6° C./min.; detector temperature, 225° C.; sensitivity, 4×10$^{-9}$ AFS.

In the chromatograms showing the results obtained, the sensitivity of the analyses is expressed in terms of amperes required for a recorder full-scale deflection (AFS) of 1 mv. Those components separated by at least 70 Kovats index units generally have a resolution greater than 1.5. The degree of resolution achieved is illustrated in FIG. 3 for a component mixture separated on the 3.8% OV–101 column. In this case the quantities injected were 20 μg. for the nitrate esters and 5 to 7 μg. for all other components.

TABLE I.—COLUMN PARAMETERS

| Stationary phase | | Solid support [a] | Packing weight (mg./ft.) |
|---|---|---|---|
| Type | Weight percent | | |
| OV–101 | 3.8 | Gas-Chrom Q | 495 |
| OV–210 | 2.5 | Chromosorb W–H.P | 380 |
| OV–225 | 1.1 | Gas-Chrom Q | 480 |

[a] 80–100 mesh.

TABLE II.—GAS CHROMATOGRAPHIC RETENTION DATA [a]

| Compound | 3.8% OV-101 column | | | 2.5% OV-210 column | | | 1.1% OV-225 column | | |
|---|---|---|---|---|---|---|---|---|---|
| | Retention time [b] (min.) | Kovats index | Retention temperature (° C.) | Retention time (min.) | Kovats index | Retention temperature (° C.) | Retention time (min.) | Kovats index | Retention temperature (° C.) |
| Diethylene glycol dinitrate [1] | 4.78 | 1,335 | 99 | 6.60 | 1,756 | 110 | 9.16 | 1,975 | 126 |
| Triacetin [3] | 5.01 | 1,348 | 100 | 6.70 | 1,762 | 110 | 7.40 | 1,846 | 115 |
| Resorcinol [2] | 5.40 | 1,376 | 102 | 2.87 | 1,461 | 87 | 12.97 | 2,266 | 148 |
| Nitroglycerine [1] | 5.56 | 1,387 | 103 | 7.91 | 1,851 | 117 | 11.65 | 2,156 | 140 |
| 2,6-dinitrotoluene [3] | 6.07 | 1,416 | 106 | 7.42 | 1,815 | 115 | 10.27 | 2,056 | 132 |
| Dimethyl phthalate [3] | 6.35 | 1,435 | 108 | 6.66 | 1,759 | 110 | 9.07 | 1,968 | 124 |
| 2,4-dinitrotoluene [3] | 7.37 | 1,497 | 114 | 9.18 | 1,944 | 125 | 11.89 | 2,176 | 141 |
| Trimethylolethane trinitrate [1] | 8.00 | 1,529 | 118 | 10.74 | 2,059 | 134 | 13.55 | 2,306 | 151 |
| 1,2,4-butanetriol trinitrate [1] | 8.05 | 1,532 | 118 | 10.76 | 2,060 | 135 | 14.43 | 2,379 | 157 |
| Di-n-propyl adipate [3] | 8.35 | 1,554 | 120 | 7.68 | 1,833 | 116 | 8.64 | 1,937 | 122 |
| Diethyl phthalate [3] | 8.54 | 1,565 | 121 | 8.42 | 1,887 | 121 | 10.82 | 2,098 | 135 |
| Diphenylamine [2] | 8.65 | 1,567 | 122 | 6.26 | 1,730 | 108 | 11.59 | 2,151 | 140 |
| 3,4-dinitrotoluene [3] | 8.77 | 1,574 | 123 | 11.00 | 2,079 | 136 | 14.28 | 2,366 | 156 |
| Triethylene glycol dinitrate [1] | 9.02 | 1,595 | 124 | 10.51 | 2,043 | 133 | 13.50 | 2,304 | 151 |
| Dimethyl sebacate [3] | 9.58 | 1,627 | 127 | 8.87 | 1,920 | 123 | 10.13 | 2,046 | 131 |
| 2,4,6-trinitrotoluene [3] | 10.79 | 1,693 | 135 | 12.90 | 2,228 | 147 | 16.76 | 2,586 | 171 |
| N-methyl-p-nitro aniline [2] | 10.90 | 1,707 | 135 | 11.62 | 2,127 | 140 | 17.14 | 2,634 | 173 |
| Methyl centralite [2] | 12.03 | 1,766 | 142 | 10.52 | 2,042 | 133 | 13.98 | 2,342 | 154 |
| Ethyl centralite [2] | 13.84 | 1,882 | 153 | 10.47 | 2,038 | 133 | 13.50 | 2,304 | 151 |
| 2-nitrodiphenylamine [2] | 13.90 | 1,886 | 153 | 12.52 | 2,196 | 145 | 16.49 | 2,574 | 169 |
| Dibutyl phthalate [3] | 14.11 | 1,913 | 155 | 12.99 | 2,236 | 148 | 15.37 | 2,472 | 162 |
| 2,5-dinitrotoluene [3] | 16.17 | 2,055 | 167 | 18.44 | 2,733 | 181 | 23.00 | 3,199 | 208 |
| Dibutyl sebacate [3] | 17.26 | 2,140 | 174 | 15.22 | 2,427 | 161 | 16.43 | 2,569 | 169 |
| Dioctyl phthalate [3] | 23.93 | 2,687 | 214 | 21.18 | 3,017 | 197 | 23.58 | 3,270 | 211 |

[a] Column temperature programmed from 70° C. to 220° C. at 6° C./min.; flame ionization detector temperature, 225° C.
[b] Retention time for CH₂Cl₂ solvent was 0.11 min.
[1] Nitrate ester.
[2] Stabilizer.
[3] Plasticizer.

Double-base propellant: Statistical methods are used to estimate the accuracy and overall precision of the method for double-base propellant quantitative analysis. The magnitude of the error variances associated with propellant extraction and sampling and of the random error variances associated with the analyses of replicate extract aliquots are evaluated by a nested experiment (based on the teachings in Fundamental Concepts in the Design of Experiments by C. R. Hicks, published by Holt, Reinhart and Winston, New York, 1964, p. 165).

The propellant selected for this analysis was HEN–12, a double-base propellant manufactured in sheet form by Radford Army Ammunition Plant and containing NG as the nitrate ester, 2-nitrodiphenylamine (2-NDPA) as the stabilizer, and di-n-propyl adipate (DNPA) as the plasticizer. The experimental design and the chromatographic analyses results are outlined in Table III.

TABLE III.—NESTED EXPERIMENT AND RESULTS

| Compound | Chromatographic condition 1 | | | | Chromatographic condition 2 | | | |
|---|---|---|---|---|---|---|---|---|
| | Extraction 1 | | Extraction 2 | | Extraction 3 | | Extraction 4 | |
| | Sample 1 | Sample 2 | Sample 3 | Sample 4 | Sample 5 | Sample 6 | Sample 7 | Sample 8 |
| NG | 40.86 | 40.04 | 39.06 | 39.90 | 39.82 | 39.83 | 39.15 | 40.02 |
| | 40.47 | 39.71 | 39.22 | 40.18 | 39.40 | 39.63 | 39.06 | 39.62 |
| | 39.72 | 39.53 | 39.26 | 39.68 | 39.59 | 39.61 | 39.10 | 38.85 |
| DNPA | 3.342 | 3.324 | 3.273 | 3.333 | 3.302 | 3.337 | 3.240 | 3.344 |
| | 3.334 | 3.314 | 3.322 | 3.337 | 3.344 | 3.352 | 3.272 | 3.311 |
| | 3.329 | 3.320 | 3.317 | 3.337 | 3.346 | 3.335 | 3.274 | 3.314 |
| 2-NDPA | 2.018 | 2.016 | 1.987 | 2.018 | 1.969 | 1.974 | 1.929 | 1.984 |
| | 2.022 | 2.014 | 2.017 | 2.017 | 1.978 | 1.977 | 1.935 | 1.971 |
| | 2.018 | 2.008 | 2.028 | 2.017 | 1.986 | 1.967 | 1.936 | 1.978 |

Figure 4:
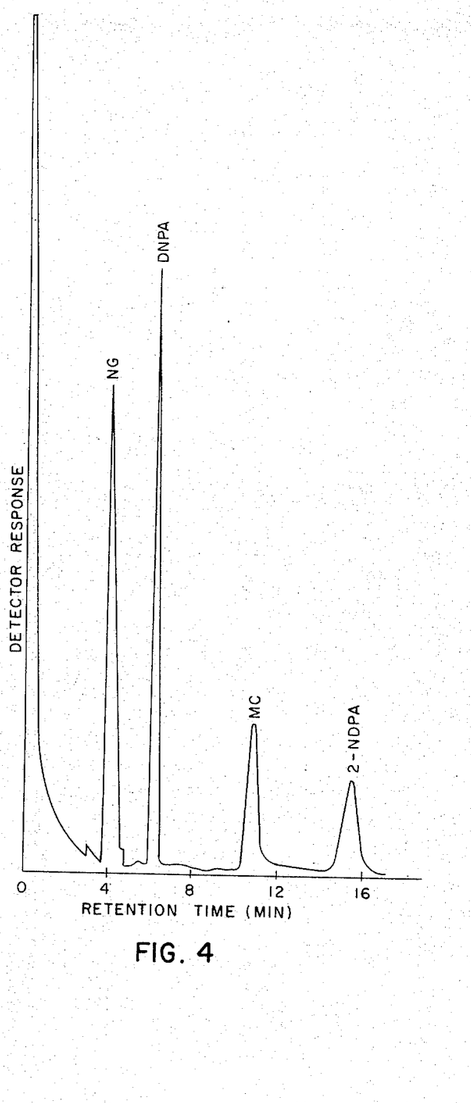
FIG. 4 is a gas chromatogram of HEN–12 propellant extract on 3.8% OV–101 column (Condition 1). Conditions: Column held at 70° C. for 1 min. then temperature-programmed to 130° C. at 15° C./min., and held for 12 min.; detector temperature, 135° C.; sensitivity, 1×10$^{-10}$ AFS for NG, 1×10$^{-9}$ AFS for other components.
Figure 5:
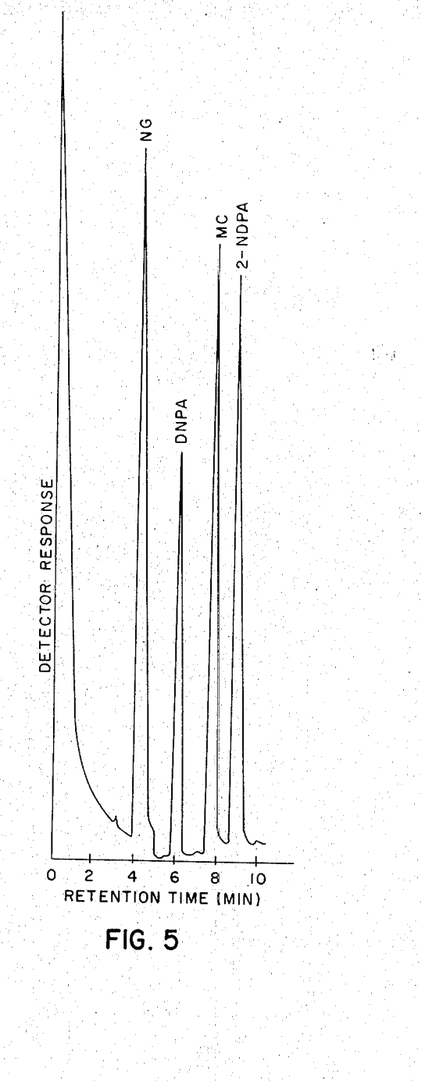
FIG. 5 is a gas chromatogram of HEN–12 propellant extract on 3.8% OV–101 column (Condition 2). Conditions: Column held at 70° C. for 1 min. then temperature-programmed to 190° C. at 15° C./min.; detector temperature, 200° C.; sensitivity, 5×10$^{-11}$ AFS for NG, 2×10$^{-9}$ AFS for DNPA, and 1×10$^{-9}$ AFS for MC and 2-NDPA.

Two chromatographic conditions, differing mainly in the flame ionization detector and column oven temperatures, were introduced primarily to evaluate the effect of the chromatographic condition on the repeatability or random error variances of replicate aliquot analyses. The specific conditions used and typical chromatograms obtained are given in FIGS. 4 and 5. At the 200° C. detector temperature (Condition 2, FIG. 5) it was possible to reduce analysis time by a factor of two. This higher temperature also produced sharper peaks for the methyl centralite (MC) internal standard and for the 2-NDPA, providing a more favorable condition for precise measurement by the electronic integrator. The 135° C. detector temperature (Condition 1, FIG. 4) provided greater sensitivity and was more favorable for NG determination. Under both conditions the peak shape of NG was symmetrical with no evidence of decomposition on the column. The septum bleed was detectable at the high sensitivity used to record the NG peak and thus produced a slight positive slope in the baseline, but it had no significant effect on the precision and accuracy of the NG determination.

As indicated in the experimental design (Table III), two propellant extractions, each providing three aliquots of duplicate samples, were performed for each of the two chromatographic conditions. The two extractions for each condition were obtained on the same day, but there was a three-day lapse between Conditions 1 and 2.

A separate calibration mixture was used for each condition, and the mixture and propellant samples were analyzed on the same day. The resulting calibration data are listed in Table IV. As was expected, the NG analysis showed the lowest sensitivity among the components, and its calibration factor was particularly large under Condition 2 because of the effect of the higher detector temperature; however, under both conditions the detector response for NG exceeded that required for precise area measurement by the integrator. The calibration factors of the other components agreed between conditions within the experimental error.

TABLE IV.—CALIBRATION DATA FOR HEN-12 PROPELLAN ANALYSIS

| Component | Condition 1 | | Condition 2 | |
|---|---|---|---|---|
| | Mg./ml.[a] | $F_o$ | Mg./ml. | $F_o$ |
| NG | 26.82 | 109.5 | 19.09 | 138.2 |
| DNPA | 2.608 | 1.318 | 2.930 | 1.333 |
| MC | 2.032 | [b]1.000 | 1.887 | 1.000 |
| 2-NDPA | 2.101 | 1.057 | 2.281 | 1.047 |

[a] 1 ml. total volume.
[b] Integrator counts=80,270 ($\mu$V.) (sec.)
 $\mu$g.

In the variance analyses, summarized in Table V, the difference between the average results of the respective conditions was statistically significant only in the determination of 2-NDPA. The fact that there was no significant difference between extractions within conditions validates the semimicro extraction procedure. The sampling error, however, was significantly greater than the random error (repeatability) of replicant aliquot analyses. The primary contributor to this discrepancy was probably inhomogeneity of the propellant which was accentuated by storage in sheet form and the small size of the samples analyzed.

TABLE V.—ANALYSIS OF VARIANCE FOR NESTED EXPERIMENT

| Source of variation | DF | NG | | DNPA | | 2-NDPA | | EMS |
|---|---|---|---|---|---|---|---|---|
| | | SS×10² | MS×10² | SS×10² | MS×10² | SS×10² | MS×10² | |
| Between chromatographic conditions | 1 | 65.010 | 65.010 | 0.05133 | 0.05133 | 1.48006 | [a]1.48006 | $\sigma^2+3\sigma^2_m+6\sigma^2_x+12\sigma^2_c$ |
| Between extractions within conditions | 2 | 112.560 | 56.280 | 0.58380 | 0.29190 | 0.11713 | 0.05861 | $\sigma^2+3\sigma^2_m+6\sigma^2_x$ |
| Between samples within extractions | 4 | 158.687 | [a]39.672 | 0.76243 | [a]0.19060 | 0.31188 | [a]0.07797 | $\sigma^2+3\sigma^2_m$ |
| Within samples (error) | 16 | 178.261 | 11.141 | 0.44028 | 0.02751 | 0.12576 | 0.00786 | $\sigma^2$ |
| Total | 23 | 514.518 | | 1.83784 | | 2.03493 | | |

[a] Significant at 5% ($\alpha=0.05$) or lower significance level.

NOTE.—DF=degrees of freedom; MS=observed mean square; SS=sum of squares; EMS=expected mean square.

The estimated random error variances $$(S_e^2)$$

and the variance components for samples $$(S_m^2)$$

were calculated from the observed and expected mean squares in Table V. The calculated values and the estimated relative standard deviations ($S_r$) for the replicant aliquot analyses are given in Table VI. A more precise estimate of the sampling error mean square was obtained by pooling the mean squares for extractions within conditions with the mean squares for samples within extractions. The estimated relative standard deviations for individual aliquot analyses (injections) were all less than 1%, which is excellent repeatability for this type of analysis. Since no significant difference was found between the respective $S_r$ values for Conditions 1 and 2, these values were likewise pooled for greater precision, and the resulting estimates are based on 16 degrees of freedom.

TABLE VI.—ESTIMATED VARIANCE COMPONENTS AND RELATIVE STANDARD DEVIATIONS

| Component | $S_e^2\times10^3$ | $S_m^2\times10^3$ | $S_r$, percent (Cond. 1) | $S_r$, percent (Cond. 2) | Pooled[a] $S_r$, percent |
|---|---|---|---|---|---|
| NG | 111.4 | 113.6 | 0.867 | 0.815 | 0.842 |
| DNPA | 0.2751 | 0.6562 | 0.425 | 0.565 | 0.595 |
| 2-NDPA | 0.07855 | 0.2122 | 0.538 | 0.316 | 0.444 |

[a] 16 degrees of freedom.

The overall precision of the method for HEN-12 propellant analysis (Table VII) was estimated by placing confidence limits ($X\pm L_{1/2}$) on a determination (X) at the 95% level, wherein $L_{1/2}$ is half the length of the interval. The $L_{1/2}$ values were calculated from the expression $$L_{1/2}=t_fS_d$$

where $t_f$ is Student's $t$ with $f$ degrees of freedom and $S_d$ is the positive square root of the total variance, which is $$S_d^2=S_e^2/n+S_m^2/k$$

for $n$ aliquot analyses of each of $k$ samples. The $f$ degrees of freedom were estimated by Satterthwaite's approximation,[1] and the $$S_e^2 \text{ and } S_m^2$$

values were taken from Table VI. As could be predicted from the Table VI data, increasing the number of samples for $n=2$ improves the precision of the determinations, to a slight degree in the case of NG and to a marked degree for DNPA and 2-NDPA.

TABLE VII.—PRECISION OF GLC ANALYSIS METHOD [a]

| Number of samples (k) | L½ at the 95% confidence level | | |
|---|---|---|---|
| | NG | DNPA | 2-NDPA |
| 1 | 0.895 | 0.0632 | 0.0360 |
| 2 | 0.729 | 0.0484 | 0.0274 |
| 3 | 0.665 | 0.0423 | 0.0238 |
| 4 | 0.630 | 0.0390 | 0.0218 |

[a] Number of replicate injection per sample (n)=2.

TABLE VIII.—COMPARISON OF CHEMICAL AND GLC ANALYSIS OF HEN-12 PROPELLANT

| | Weight percent | | | |
|---|---|---|---|---|
| Component | Nominal | Chemical | GLC (Cond. 1) | GLC (Cond. 2) |
| NG | 40.6 | 40.11 | 39.80 | [a] 39.47 |
| DNPA | 3.3 | 3.30 | 3.32 | 3.31 |
| 2-NDPA | 2.0 | 1.98 | [a] 2.02 | 1.97 |

[a] Significantly different from chemical analysis at 5% significance level.

The accuracy of the method was estimated by comparing the average GLC results with those of standardized chemical determinations supplied by the propellant manufacturer (Table VIII). Although two of the individual GLC determinations show a substantial variance at the 5% significance level, the averages obtained by combining the results of Conditions 1 and 2 do not differ significantly from the chemical results.

Figures 6, 7, 8:
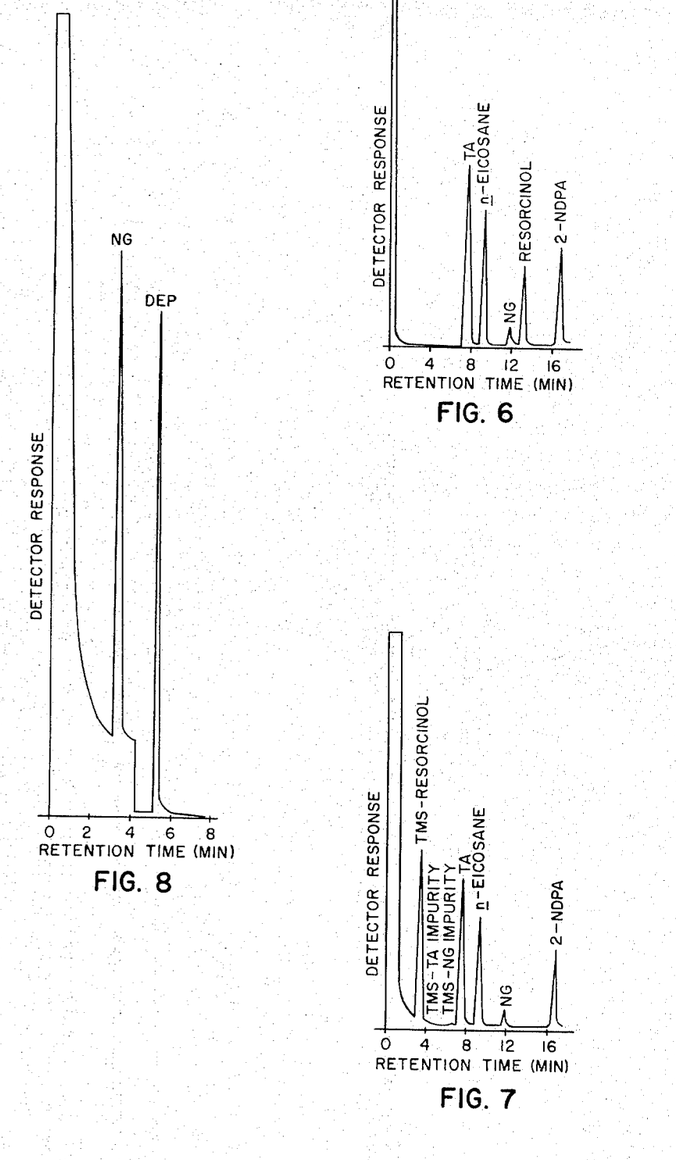
FIG. 6 is a gas chromatogram of simulated CMBD propellant extract on 1.1% OV–225 column. Conditions: Column temperature-programmed from 70° C. to 190° C. at 6° C./min.; detector temperature, 200° C.; sensitivity, 1×10$^{-9}$ AFS.
FIG. 7 is a gas chromatogram of silylated N,O-bis(trimethylsilyl) acetamide (BSA) CMBD propellant extract (simulated) on 1.1% OV–225 column. Conditions: Column temperature-programmed from 70° C. to 190° C. at 6° C./min.; detector temperature, 200° C.; sensitivity, 1×10$^{-9}$ AFS.
FIG. 8 is a gas chromatogram for the separation of nitroglycerine (NG) and diethyl phthalate (DEP) from a pharmaceutical extract.

Composition-modified double-base propellant: A simulated composite-modified double-base propellant (CMDB) containing triacetin (TA), NG, resorcinol, and 2-NDPA was analyzed to demonstrate applicability of the method to a mixture that is more difficult to separate and quantitatively determine. The column chosen for this experiment, based on the retention data in Table II, was the polar 1.1% OV-225. n-Eicosane was used as the internal standard. The propellant extract was first analyzed directly as shown by the chromatogram in FIG. 6. The extract was then treated with BSA to form the trimethylsilyl (TMS) ether of resorcinol and the silylated mixture was analyzed (FIG. 7). Good separations and a high degree of analytical precision were achieved in both cases.

In direct determination of resorcinol, it was found that a high quality packing with a minimum of active sites would prevent most of the adsorption and peak tailing that normally occurs. The small amount of adsorption that could still take place was eliminated by conditioning the column with a 2-$\mu$l. injection of a 5 mg./ml. solution of resorcinol in 1,2-dichloroethane prior to each series of resorcinol determinations. There was no evidence of NG decomposition on the column or interaction between the NG and the other components. The NG contained an impurity that was partially separated and appeared as a rear shoulder on the main peak (FIG. 6). This shoulder was included in the peak area measurement.

The TMS-resorcinol has a much shorter retention time than resorcinol itself, and its flame ionization detector response is greater by a factor of almost three. The TMS-resorcinol is ready for an analyses immediately after the silylation mixture is shaken. The procedure silylated the impurities of TA as well as NG (FIG. 7).

[1] C. R. Hicks, Fundamental Concepts in the Design of Experiments, Holt, Rinehart and Winston, New York, 1964, p. 197.

TABLE IX.—COMPOSITION AND REPEATABILITY DATA FOR SIMULATED CMDB PROPELLANT ANALYSIS

| | | Without silylation | | With silylation | |
|---|---|---|---|---|---|
| Component | Mg./ml.[a] | $F_o$ | $S_r$, percent [b] | $F_o$ | $S_r$, percent |
| TA | 4.737 | 2.925 | 0.619 | 2.980 | 0.393 |
| NG | 29.70 | 139.7 | 0.654 | 169.2 | 2.12 |
| n-Eicosane | 1.015 | 1.000 | | 1.000 | |
| Resorcinol | 1.106 | 1.929 | 0.549 | 0.6971 | 0.259 |
| 2-NDPA | 0.950 | 1.294 | 0.360 | 1.310 | 0.620 |

[a] Ml. total volume.
[b] 10 degrees of freedom.

Table IX outlines the composition of the simulated CMDB mixture before silylation, and the calibration factors and relative standard deviations with and without silylation. The increase in TA and NG calibration factors after silylation is attributed to the removal of their impurities. The close agreement between the two factors for 2-NDPA shows that this component did not form a TMS derivative under the silylation conditions used. No explanation can be offered for the significant increase after silylation in the estimated relative standard deviation for the NG determination—from 0.654% to 2.12%—but the larger value is acceptable for NG determination.

The GLC method described above is an attractive alternative to many of the standardized wet-chemical and spectrometric methods currently being used to determine the components of nitrocellulose-base propellants. The method is simple and rapid, and has been demonstrated to be very accurate and precise. The total time for quantitative determination on duplicate propellant samples is within two hours, and the estimated relative standard deviations for individual determinations are generally less than 1%. The three components of primary interest—nitrate esters, stabilizers, and plasticizers—can be determined by the same procedure, and the applicability of the method to double-base and to composite-modified double-base propellants has been demonstrated.

Pharmaceutical preparations—GLC determinations: The method of this invention also serves as a precise gas-liquid chromatographic method for determining nitroglycerine in 10% nitroglycerine-lactose powder and in nitroglycerine tablets. The nitroglycerine is extracted with 1,2-dichloroethane on a semimicro scale, and separated on a ⅛-in. x 2-ft. stainless steel column containing 3% UCW-98 on 80–100 mesh Gas-Chrom Q. Diethyl phthalate is used as an internal standard for quantitative determinations. A 10% nitroglycerine-lactose powder and tablets containing 0.3, 0.4, and 0.6 mg. of nitroglycerine per tablet were assayed. The average analysis time for a single sample was 15 minutes. The precision of the method was evaluated by statistical techniques. The estimated relative standard deviations for the analysis of individual powder and tablet extract aliquots were 0.909% and 1.45% respectively.

The gas-liquid chromatographic (GLC) method described above for determination of nitroglycerine (glyceryl trinitrate) and other nitrate esters in nitrocellulose-base propellants can be successfully applied, with slight modifications, to the assay of nitroglycerine (NG) in commercially produced 10% (nominal) NG-lactose powder and in sublingual NG tablets prepared from the same mixture. This technique appears to offer the simplest, most rapid, and most accurate means devised to date for routine quality control of such pharmaceutical preparations.

The standard assay method specified in the U.S. Pharmacopeia, i.e., column chromatographic separation of the NG and subsequent quantitative determination by absorption spectrometry, is involved and time-consuming. Other available methods, described in the literature, are either unsuitable or undesirable for this application. One GLC method reported is applied only to the detemination of NG and other nitrate esters in admixtures, and featured flash vaporization of an ethanol extract of NG, separation on short columns at low temperatures, and thermal conductivity detection.

The use of a flame ionization detector increases the NG detection sensitivity, thus permitting smaller samples to be precisely assayed; the total time for sample preparation and assay is substantially reduced by using a semimicro extraction procedure followed by aliquot analyses on a short, lightly-loaded column; and the precision and accuracy of the assay are improved by using (1) high quality columns, (2) on-column injection of aliquots with column temperature programming, (3) and electronic digital integrator for measuring peak areas, and (4) an internal standard technique.

EXPERIMENTAL

Apparatus and conditions

The chromatograph used is a Hewlett-Packard model 7624A equipped with a 3370A electronic digital integrator for measuring peak areas. The eluted components are detected with a dual hydrogen flame ionization detector operated at a temperature of 135° C. The dual columns were 1/8-in. x 2-ft. stainless steel tubing (Hewlett-Packard) packed with 3% by weight UCW–98 on 80–100 mesh Gas-Chrom Q (Applied Science Laboratories, Inc.). A 1/8-in. Swagelok brass T installed inside the column oven between the exit of the standard injection block and the entrance to column A served as an on-column injection port. A Teflon-faced system is used to minimize septum bleed. The helium carrier gas flow rate is set at 40 ml./min., and the air flow rate is set at 500 ml./min. The hydrogen flow rate is set at 32 ml./min. to give maximum detector response. All of the gases are passed through molecular sieve driers before they enter the chromatograph.

The packing was prepared by a filtration-fluidization procedure to obtain a uniform, high quality coating of the stationary phase on the solid support. The packing was added to the stainless steel tubing in small increments and the tubing was tapped during the process. The packed columns were conditioned overnight at a temperature of 250° C. while maintaining a constant helium flow of 10–15 ml./min. For each column, different sized aliquots of the calibration mixture were analyzed to ensure that detector response as a function of NG weight was linear with zero intercept: a curvilinear response function would indicate significant decomposition of the NG because of an unsatisfactory column.

All aliquot samples were injected on the column at a column oven temperature of 70° C., and this temperature was maintained for 1 minute after injection. The oven temperature was then linearly programmed to 130° C. at the rate of 15° C./min., and held at this temperature until the internal standard eluted.

Internal standard

Diethyl phthalate (DEP) was selected as the internal standard for quantitative determinations. Preliminary investigations evaluated both gravimetric and volumetric methods for measuring the amount of the internal standard; the gravimetric method proved to be slightly more precise, but the volumetric method was selected because of its greater convenience and speed. A stock solution of the internal standard was prepared by dissolving 25 mg. of reagent grade DEP (Eastman Organic Chemicals) in reagent grade 1,2-dichloroethane (Eastman) and diluting this solution to 50 ml. in a volumetric flask.

Calibration

Neat NG for calibration was obtained from a 78% by weight solution of NG in acetone (Hercules, Inc.) by evaporating the acetone from a 0.5-ml. quantity at room temperature. Since the neat NG is an explosive and very sensitive to initiation by shock, only small quantities were handled and proper safety precautions were taken.

A single calibration mixture was prepared as follows: a 9-to-10-mg. sample of the neat NG was weighed, to a precision of ±0.001 mg. by a Cahn Gram Electrobalance, into a DSC (differential scanning calorimeter) aluminum pan (Perkin Elmer Corporation). The pan was placed in a 1-dram, polyethylene-stoppered, glass vial; 2 ml. of the internal standard solution was added by pipet; and the sealed vial was vigorously shaken on a No. 5000 mixer/mill (SPEX Industries, Inc.) for 1 minute. The mixture was then transferred to another 1-dram vial to separate it from the aluminum pan.

Four 2-$\mu$l. aliquots of the calibration mixture were analyzed to establish the NG calibration factor, F:

$$F = \frac{\text{(DEP peak area) (mg. of NG)}}{\text{(NG peak area) (mg. of DEP)}} \quad (1)$$

It was found that F was independent of the weight of NG injected and the column temperature programming rate, but that it increased linearly with the detector temperature up to 250° C. due to decomposition of the NG in the interconnecting tubing between the exit of the column and the entrance to the detector jet. Since in this particular equipment the tubing has the same temperature as the detector, it was necessary to carefully control the detector temperature between calibration and sample analyses, and to establish a new calibration factor each day before beginning a series of analyses.

Samples

The NG-lactose powder samples were taken from 3 g. of a lot that according to the manufacturer contained a nominal 10% by weight of NG. Each sample consisted of approximately 0.1±0.001 g. of the powder weighed into a 1-dram glass vial. A 2-ml. quantity of the internal standard solution was added by pipet and the sealed vial was shaken on the mixer/mill for 2 minutes. The slurry was then centrifuged for 5 minutes to separate the extract from the lactose.

The tablet samples were prepared from three nominal concentrations (0.3, 0.4, 0.6 mg.) of NG tablets, each from a different bottle of 50 tablets. The approximate weight of each tablet, which did not enter into the calculations, was 350 mg. The extract was prepared by placing 20 NG tablets and an empty DSC aluminum pan in a 1-dram glass vial, adding 2 ml. of the internal standard solution by pipet, sealing the vial, and shaking the sealed vial on the mixer/mill for 10 minutes to pulverize the tablets and extract the NG. The slurry was then centrifuged for 5 minutes to separate the extract from the lactose.

Analysis

The analysis procedure was the same for the powder and tablet extracts. For each series of measurements, replicate 2-l. aliquots of the extract were assayed. The total milligrams of NG were calculated by the expression $$\text{Mg. of NG} = \frac{\text{(NG peak area) (mg. of DEP) (F)}}{\text{(DEP peak area)}} \quad (2)$$

Since the same internal standard stock solution and same pipet were used in preparing both the calibration mixture and the samples for each series of analyses, it was possible to disregard the weight of DEP in solving Equations 1 and 2.

RESULTS

The high quality of NG separation achievable by this method is indicated by the sharpness and symmetry of the NG peak in FIG. 8, which is typical of the gas chromatograms obtained in the study. The adjusted retention times for NG and DEP were 3.25 and 5.15 minutes respectively. The chromatograms were recorded using an electrometer range setting of 1000 and recorder full-scale settings of 1 mv. for the NG and 10 mv. for the DEP.

NG-lactose powder

For the determination of NG in the 10% NG-lactose powder, three extract aliquots from each of four samples of the powder were assayed. The results of the analysis of variance are given in Table X. The mean square (variance) among samples was more than twice as large as the mean square for replicate aliquots within samples; however, there was no significant difference between these two mean squares at the 5% ($\alpha=0.05$) significance level, which indicates that the variation among sample averages was not significantly greater than the variability of the GLC technique itself. Consequently the data show that the powder is a homogeneous mixture.

The average analysis results and estimated relative standard deviations for individual aliquot analyses are given in Table XI. The two mean squares in Table X were pooled to estimate the random error variance used in calculating the confidence limits. The confidence interval on the average assay would be expected to include, with 95% confidence, the true average NG percentage of the lot (population). Since the resulting nominal percentage falls within this interval, the 10% concentration given by the manufacturer is considered to be correct within the experimental error of the assay.

NG tablets

In the assay of the tablets for NG, analyses were made of four extract aliquots from each of two samples at each of the three concentrations. The analysis of variance results are given in Table XII. Both the mean square among concentrations and the mean square between samples within concentrations were significantly larger than the mean square within samples. The large value for the mean square among concentrations was expected because three different nominal concentrations were combined in the calculation. Since the mean square between samples within concentrations is an estimate of the variability between average sample assays at each concentration, the significant variance in this case was due to the manufacturing process.

The sample confidence intervals for the analysis results, given in Table XIII, were calculated from the mean square within samples (Table XII). As indicated by the 95% confidence intervals, all of the 0.3-mg. tablet samples were significantly smaller than nominal; however, all of the percentages were well within the 80–120% of nominal limits specified in the U.S. Pharmacopeia.

The GLC method described above is not only simple and rapid, but offers a high degree of precision and accuracy. The average analysis time per sample is about 15 minutes. The estimated relative standard deviations of individual aliquot determinations for the calibration mixture, the 10% NG-lactose powder, and the NG tablets were 0.513%, 0.909%, and 1.45% respectively. The fact that there was no significant difference between the NG determination and nominal values for the basic 10% NG-lactose powder indicates that this assay technique provides accurate results.

TABLE X.—ANALYSIS OF VARIANCE FOR 10% NG-LACTOSE POWDER

| Source of variation | Degrees of freedom | Sum of squares ($\times 10^2$) | Mean square ($\times 10^2$) |
|---|---|---|---|
| Among samples | 3 | 5.267 | 1.756 |
| Within samples | 8 | 6.572 | 0.822 |
| Total | 11 | 11.839 | |

TABLE XI.—GLC DETERMINATION OF NG IN 10% NG-LACTOSE POWDER

| Sample number | Weight percent NG | Standard deviation [a] |
|---|---|---|
| 1 | 10.01 | 0.098 |
| 2 | 9.88 | 0.108 |
| 3 | 10.06 | 0.084 |
| 4 | 9.94 | 0.068 |
| Average [b] | 9.97±0.07 | |

[a] 2 degrees of freedom.
[b] 95% confidence limits with 11 degrees of freedom.

TABLE XII.—ANALYSIS OF VARIANCE FOR NG TABLETS

| Source of variation | Degrees of freedom | Sum of squares ($\times 10^4$) | Mean squares ($\times 10^4$) |
|---|---|---|---|
| Among concentrations | 2 | 2,991.697 | [a] 1,495.849 |
| Between samples within concentrations | 3 | 20.922 | [a] 6.974 |
| Within samples | 18 | 6.263 | 0.3479 |
| Total | 23 | 3,018.882 | |

[a] Significant at 1% ($\alpha=0.01$) significant level.

TABLE XIII.—GLC DETERMINATION OF NG IN NG TABLETS

| Nominal (mg./tablet) | GLC (mg./tablet) | 95% confidence interval | GLC average (mg./tablet) |
|---|---|---|---|
| 0.3 | 0.282 | 0.276–0.288 | 0.288 |
|     | 0.295 | 0.289–0.301 |       |
| 0.4 | 0.390 | 0.384–0.396 | 0.378 |
|     | 0.367 | 0.361–0.373 |       |
| 0.6 | 0.548 | 0.542–0.554 | 0.557 |
|     | 0.566 | 0.560–0.572 |       |

We claim:
1. The method of separating and determining qualitative and quantitative information for nitrate esters, stabilizers, and plasticizers contained in a mixture, said nitrate esters, stabilizers, and plasticizers of said mixture being selected from the group consisting of diethylene glycol dinitrate, triacetin, resorcinol, nitroglycerine, 2,6-dinirtotoluene, dimethyl phthalate, 2,4-dinitroluene, trimethylolethane trinitrate, 1,2,4-butanetriol trinitrate, di-n-propyl adipate, diethyl phthalate, diphenylamine, 3,4-dinitrotoluene, triethylene glycol dinitrate, dimethyl sebacate, 2,4,6-trinitrotolene, n-methyl-p-nitro aniline, methyl centralite, ethyl centralite, 2-nitrodiphenylamine, dibutyl phthalate, 2,5-dinitrotoluene, dibutyl sebacate, dioctyl phthalate and mixtures thereof, said method comprising:

(a) dissolving a sample of said mixture in an organic solvent selected from methylene chloride and 1,2-dichloroethane;

(b) separating the dissolved sample;

(c) injecting a small, predetermined amount of said dissolved sample on a prepared and conditioned chromatographic column, said prepared and conditioned chromatographic column being of predetermined quality and size which contains a solid support packing material comprised of a flux-calcined diatomaceous earth that is coated with a silicone stationary phase selected from the group consisting of nonpolar dimethylsilicone, polar trifluoropropyl silicone, and highly polar cyanopropyl phenyl silicone, said prepared and conditioned chromatographic column conditioned at a predetermined elevated temperature while being subjected to a flow of an inert carrier gas through said column, and said column subsequently being positioned in a column oven that is programmed at a predetermined column oven temperature prior to said injecting;

(d) maintaining said column temperature for a predetermined period of time after said injecting, and thereafter, linearly programming the column oven temperature to a predetermined value at a predetermined rate of heating;

(e) eluting the injected sample with an inert carrier gas flowing at a predetermined rate of flow while maintaining said oven temperature;

(f) detecting said eluted sample at a predetermined detector temperature with a flame ionization detector to establish a chromatogram of the component which relates the detector response to the retention time of said eluted sample; and, thereafter, (g) analyzing said chromatogram to obtain qualitative information for identifying the components of said eluted sample which comprises correlating the chromatogram to a standard chromatogram established from a known internal standard and further analyzing said chromatogram by area measurements of the peaks of the chromatogram, and thereafter, correlating the area measurements of the peaks of the chromatogram with the amount of an internal standard to obtain quantitative information for the components of said eluted sample.

2. The method of claim 1 wherein said predetermined temperature at which said column is conditioned is about 250° C., wherein said column oven predetermined programmed temperature is about 70° C., and wherein said predetermined detector temperature is programmed up to about 225° C. while hydrogen gas flow rate is maintained at about 32 milliliters per minute and air flow rate is maintained at about 500 milliliters per minute.

3. The method of claim 1 wherein said dissolving of sample of said mixture is accomplished with the selected organic solvent methylene chloride while said sample and solvent are subjected to a predetermined amount of exposure to ultrasonic radiation to facilitate said dissolving; said chromatographic column is about ⅛ inch in diameter and about 2 feet in length and said chromatographic column is prepared from chromatographic grade stainless steel; said stationary phase contained in said column is nonpolar dimethylsilicone which comprises about 3.8 percent by weight of the packing material of said column; said injecting injects the predetermined amount of about 1 microliter of said dissolved sample on said column; said maintaining of said column temperature of about 70° C. is maintained for about 1 minute after said injecting of the small amount of dissolved sample and said column temperature is then programmed from about 70° C. to about 220° C. at about 6° C. per minute while eluting of the small sample is accomplished with the inert gas helium with a predetermined flow rate of about 40 milliliters per minute; and said analyzing of said chromatogram establishes qualitative information to identify said nitrate esters, stabilizers, and plasticizers which are eluted over the retention temperature range about 99° C. to about 214° C., which have retention times ranging from about 4.78 minutes to about 23.93, and which have Kovats' retention indices ranging from about 1335 to about 2687.

4. The method of claim 1 wherein said analyzing of said chromatogram establishes qualitative information to identify diethylene glycol dinitrate.

5. The method of claim 1 wherein said analyzing of said chromatogram establishes qualitative information to identify triacetin.

6. The method of claim 1 wherein said analyzing of said chromatogram establishes qualitative information to identify resorcinol.

7. The method of claim 1 wherein said analyzing of said chromatogram establishes qualitative information to identify nitroglycerine.

8. The method of claim 1 wherein said analyzing of said chromatogram establishes qualitative information to identify 2,6-dinitrotoluene.

9. The method of claim 1 wherein said analyzing of said chromatogram establishes qualitative information to identify dimethyl phthalate.

10. The method of claim 1 wherein said analyzing of said chromatogram establishes qualitive information to identify 2,4-dinitrotoluene.

11. The method of claim 1 wherein said analyzing of said chromatogram establishes qualitative information to identify trimethylolethane trinitrate.

12. The method of claim 1 wherein said analyzing of said chromatogram establishes qualitative information to identify 1,2,4-butanetriol trinitrate.

13. The method of claim 1 wherein said analyzing of said chromatogram establishes qualitative information to identify di-n-propyl adipate.

14. The method of claim 1 wherein said analyzing of said chromatogram establishes qualitative information to identify diethyl phthalate.

15. The method of claim 1 wherein said analyzing of said chromatogram establishes qualitative information to identify diphenylamine.

16. The method of claim 1 wherein said analyzing of said chromatogram establishes qualitative information to identify 3,4-dinitrotoluene.

17. The method of claim 1 wherein said analyzing of said chromatogram establishes qualitative information to identify triethylene glycol dinitrate.

18. The method of claim 1 wherein said analyzing of said chromatogram establishes qualitative information to identify dimethyl sebacate.

19. The method of claim 1 wherein said analyzing of said chromatogram establishes qualitative information to identify 2,4,6-trinitrotoluene.

20. The method of claim 1 wherein said analyzing of said chromatogram establishes qualitative information to identify n-methyl-p-nitro aniline.

21. The method of claim 1 wherein said analying of said chromatogram establishes qualitative information to identify methyl centralite.

22. The method of claim 1 wherein said analyzing of said chromatogram establishtes qualitative information to identify ethyl centralite.

23. The method of claim 1 wherein said analyzing of said chromatogram establishes qualitative information to identify 2-nitrodiphenylamine.

24. The method of claim 1 wherein said analyzing of said chromatogram establishes qualitative information to identify dibutyl phthalate.

25. The method of claim 1 wherein said analyzing of said chromatogram establishes qualitative information to identify 2,4-dinitrotoluene.

26. The method of claim 1 wherein said analyzing of said chromatogram establishes qualitative information to identify dibutyl sebacate.

27. The method of claim 1 wherein said analyzing of said chromatogram establishes qualitative information to identify dioctyl phthalate.

28. The method of claim 1 wherein said dissolving of sample of said mixture is accomplished with the selected organic solvent methylene chloride while said sample and said solvent are subjected to a predetermined amount of exposure to ultrasonic radiation to facilitate said dissolving; said chromatographic column is about ⅛ inch in diameter and about 2 feet in length and said chromatographic column is prepared from chromatographic grade stainless steel; said stationary phase contained in said column is polar trifluoropropyl silicone which comprises about 2.5 percent by weight of the packing material of said column; said injecting injects the predetermined amounts of about 1 microliter of said dissolved sample on said column; said maintaining of said column temperature of about 70° C. is maintained for about 1 minute after said injecting of the small amount of dissolved sample and said column temperature is then programmed from about 70° C. to about 220° C. at about 6° C. per minute while eluting of the small sample is accomplished with the inert gas helium with a predetermined flow rate of about 40 milliliters per minute; and said analyzing of said chromatogram establishes qualitative information to identify said nitrate esters, stabilizers, and plasticizers which are eluted over the retention temperature range from about 87° C. to about 197° C., which have retention times ranging from about 6.60 minutes to about 21.18, and which have Kovats' retention indices ranging from about 1461 to about 3017.

29. The method of claim 1 wherein said dissolving of sample of said mixture is accomplished with the selected organic solvent methylenechloride while said sample and said solvent are subjected to a predetermined amount of ultrasonic radiation to facilitates said dissolving; said chromatographic column is about ⅛ inch in diameter and about 2 feet in length and said chromatographic column is prepared from chromatographic grade stainless steel;

said stationary phase contained in said column is highly polar cyanopropyl phenyl silicone which comprises about 1.1 percent by weight of the packing material of said column; said injecting injects the predetermined amount of about 1 microliter of said dissolved sample on said column; said maintaining of said column temperature of about 70° C. is maintained for about 1 minute after said injecting of the small amount of dissolved sample and said column temperature is then programmed from about 70° C. to about 220° C. at about 6° C. per minute while eluting of the small sample is accomplished with the inert gas helium with a predetermined flow rate of about 40 milliliters per minute; and said analyzing of said chromatogram establishes qualitative information to identify said nitrate esters, stabilizers, and plasticizers which are eluted over the retention temperature range from about 114° C. to about 211° C., which have retention times ranging from about 7.40 minutes to about 23.58, and which have Kovats' retention indices ranging from about 1846 to about 3270.

30. The method of claim 1 wherein said dissolving of sample of said mixture is accomplished with the selected organic solvent 1,2-dichloroethane while said sample and said solvent are subjected to a predetermined amount of shaking on a mixer/mill and followed by a predetermined amount of centrifuging to facilitate said dissolving and said separating of said sample from said mixture; said chromatographic column is about ⅛ inch in diameter and about 2 feet in length and said chromatographic column is prepared from chromatographic grade stainless steel; said stationary phase contained in said column is nonpolar dimethylsilicone which comprises about 3 percent by weight of the packing material of said column; said injecting injects the predetermined amount of about 2 microliters of said dissolved sample on said column; said maintaining of said column temperature of about 70° C. is maintained for about 1 minute after said injecting of the small amount of dissolved sample and said column temperature is then programmed from about 70° C. to about 130° C. at about 15° C. per minute while eluting of the small sample is accomplished with the inert gas helium with a predetermined flow rate of about 40 milliliters per minute; and said analyzing of said chromatogram establishes qualitative information to identify the nitrate ester, nitroglycerine, having a retention time of about 3.25 minutes.

References Cited

Trowell et al., Anal. Chem. 41, No. 1, January 1969, 166–168.

Landram et al., Anal. Chem. 42, No. 1, January 1970, 170–109.

F. I. H. Tunstall, Anal. Chem. 42, No. 4, April 1970, 542–543.

ROBERT M. REESE, Primary Examiner